United States Patent [19]

Lexen

[11] Patent Number: 4,706,930

[45] Date of Patent: Nov. 17, 1987

[54] VALVE ARRANGEMENT FOR USE WITH A HYDRAULIC ACCUMULATOR

[76] Inventor: Gerald Lexen, Johann Emmerstrasse 1,8000, München 50, Fed. Rep. of Germany

[21] Appl. No.: 922,747

[22] Filed: Oct. 24, 1986

[30] Foreign Application Priority Data

Jan. 27, 1986 [DE] Fed. Rep. of Germany ....... 3602362

[51] Int. Cl.[4] ...................... F16K 31/124; F16K 31/02

[52] U.S. Cl. .......................................... 251/26; 91/33; 91/452; 60/413; 137/596.16; 251/30.01; 251/44

[58] Field of Search ...................... 60/413, 418; 91/33, 91/433, 452; 137/459, 487.5, 596.13, 596.16; 251/26, 30.01, 30.02, 30.05, 44

[56] References Cited

U.S. PATENT DOCUMENTS

| | | | |
|---|---|---|---|
| 2,925,984 | 2/1960 | Kowalski | 251/26 |
| 3,279,484 | 10/1966 | Brinkel | 251/26 |
| 3,533,434 | 10/1970 | Smith | 251/26 |
| 3,593,741 | 7/1971 | Odenthal et al. | 251/26 |
| 3,693,506 | 9/1972 | McMillen et al. | 91/433 |
| 3,980,002 | 9/1976 | Jarman et al. | 251/30.05 |
| 4,070,831 | 1/1978 | Rutz | 60/413 |
| 4,149,565 | 4/1979 | Jennings et al. | 251/44 |
| 4,309,021 | 1/1982 | Hafele | 251/26 |
| 4,340,086 | 7/1982 | Hemm et al. | 91/452 |
| 4,463,818 | 8/1984 | Sonneborn | 60/413 |

*Primary Examiner*—George L. Walton

[57] ABSTRACT

A valve arrangement for connecting a hydraulic machine, such as a pump or a motor, with a pressure accumulator in which a conventional manual shutoff valve is replaced by a leak-proof pressure controlled valve whose operating pressure signal is supplied by a shuttle valve from that one of two ports of the pressure controlled valve at which the higher pressure prevails at a given time. The pressure controlled valve is supplied with fluid under pressure by way of a leak-proof remote controlled slide valve.

11 Claims, 1 Drawing Figure

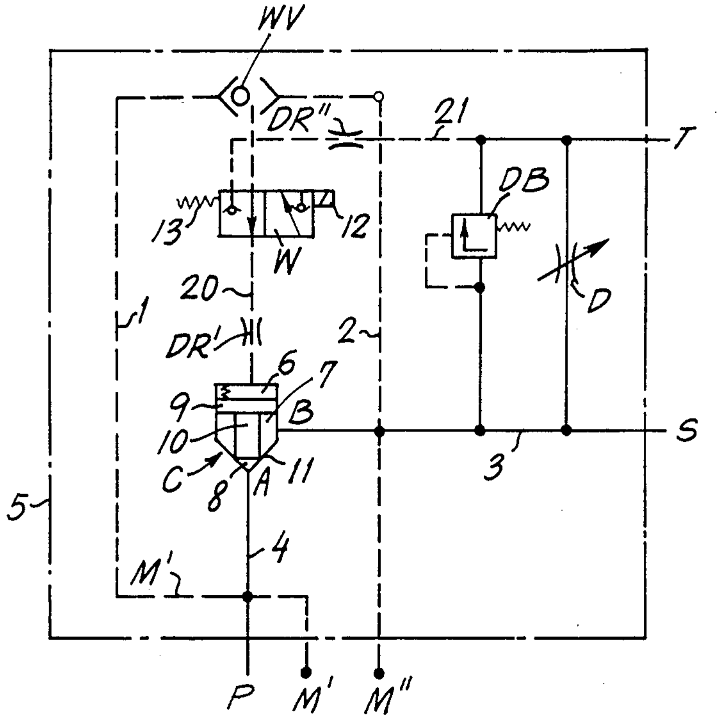
WV
DR''
21
T
DB
13
12
W
20
D
1
DR'
2
6
7
9
B
10
S
C
3
8
A
11
5
4
M'
P
M'
M''

VALVE ARRANGEMENT FOR USE WITH A HYDRAULIC ACCUMULATOR

BACKGROUND OF THE INVENTION (a) Field of the Invention

The invention relates to valve arrangements for connection of a hydraulic accumulator with a hydraulic machine such as a hydraulic pump or motor.

(b) Prior Art

Constructions are known in which a hydraulic machine able to be selectively operated as a pump converts surplus kinetic energy into potential energy by charging a high pressure or low pressure accumulator. This potential energy may then be utilized when required, for example, by driving the hydraulic machine as a motor.

Between the hydraulic machine and the pressure accumulator there is a shutoff valve which has to be completely leak-proof in order to ensure that there is no chance at any time of the hydraulic machine being acted upon by the pressure and thus caused to run, especially in the case of a positive displacement machine, since then such a leaking shutoff valve would cause such an accumulation of pressure in the course of time that the machine would be put into operation.

In the prior art such a shutoff valve has always been a hand-operated shutoff valve which was opened and shut when the need arose.

Such a hand-operated shutoff valve only makes a relatively coarse control possible, especially since every opening and closing operation is slow.

If such a pressure accumulator is mounted on a vehicle and it is to be used for operation of the vehicle, the use of such a hand-operated shutoff valve is quite out of the question, since its operation would be too much of a distraction for the driver.

In order to make possible an even more efficient use of the excess energy in a stationary plant or in a vehicle, especially when there has to be a frequent change in the mode of operation, it is necessary to integrate the shutoff valve in an automatic or other control system so that it is no longer controlled by hand but rather by control signals. As has been shown by tests undertaken by the assignee, the coupling of an actuator with a conventional shutoff valve does not lead to satisfactory results since the actuating force is excessive or the shutoff valve is too slow to switch from one setting to the other.

Since during operation, pressure in excess of 400 bar may occur at the shutoff valve, it is not possible to employ a conventional remote controlled spool valve, since it would not be sufficiently leak-proof and furthermore, dependent on the particular type, very high forces might be produced by it and then act on the actuator.

SUMMARY OF THE INVENTION

In view of this prior art, one object of the present invention is to so improve a valve arrangement of conventional design as noted that it may be operated by a control signal without impairing operational safety and reliablity.

A further object of the invention is to make it possible for the valve to rapidly respond to such a control signal.

In order to achieve these or other objects, the arrangement in accordance with the invention comprises a leak-free shutoff valve having one port connected with the pressure accumulator and another port connected with a hydraulic machine such as a pump, a safety valve which opens on reaching a permissible maximum pressure and which is connected to the pressure accumulator and a tank. The shutoff valve has an actuator piston moving in a leak-proof manner in a cylinder so that it may be operated by an actuating pressure and it also has a valve member able to be pressed against a valve seat when the piston is acted upon by the activating pressure. There is furthermore a shuttle valve which is so connected by a respective control line with each of the two ports of the shutoff valve and a supply line leading to the cylinder so that the supply line is connected with that one of the two ports at which the higher pressure prevails. Furthermore, there is a leak-proof remote-controlled control valve in the supply line leading to the cylinder. When operated, the leak-proof control valve interrupts the connection between the shuttle valve and the cylinder and opens up a connection between the cylinder and the tank.

In this respect, the principle is that it is not a shutoff valve arranged in a power line that is directly operated, but rather a hydraulic control circuit is operated by means of a leak-free control valve (which may be operated by a comparatively small force) and the control circuit in turn supplies the actuating force necessary for operation of the shutoff valve.

In keeping with the invention, the shutoff valve has an actuating cylinder with an actuator piston sliding therein: This actuator piston carries a valve member which may engage a valve seat with a sealing effect which is perfectly free of leakage even at a very high pressure differential across it providing that there is a sufficiently high back pressure acting on the actuator piston, for the pressures acting on the two sides of the valve seat tend to displace the actuator piston so that the valve member is moved clear of the valve seat.

In order to provide a sufficiently high control pressure at all times, in accordance with the invention, the two outlet ports of the novel shutoff valve are connected with a shuttle valve on the two sides of the valve seat, and the third port of the shuttle valve is connected with the actuator cylinder of the shutoff valve. The pressure differential operating the shuttle valve is equal to the pressure differential present across the shutoff valve, and the respectively higher pressure present thereat is applied by the shuttle valve to the actuator cylinder. Accordingly, the actuator piston is always subject to a pressure which is sufficient to press the valve member firmly on the valve seat.

The actuator piston is filled in the actuator cylinder so as to be free of leaks; however, in accordance with a preferred form of the invention, the port of the shutoff valve, which is separated from the interior of the actuator cylinder by the actuator piston only, is connected with the pressure accumulator; as long as the shutoff valve is closed, that is to say especially during times in which the valve arrangement in accordance with the invention is not being used, no pressure differential will occur across the actuator piston so that the shutoff valve will be kept in a leak-proof shut condition indefinitely, as has been the case with hand-operated shutoff valves heretofore in use.

For opening the shutoff valve, there is a remote controlled valve placed between the actuator cylinder of the shutoff valve and the shuttle valve. In its neutral or inactive setting, the remote controlled valve produces a connection between the shuttle valve and the actuator cylinder, whereas in the operating condition it shuts off the passage to the shuttle valve and releases pressure from the actuator cylinder into a tank or other vessel.

Although, as noted previously, there are the same high pressures as in the shutoff valve, the rate of flow of the hydraulic liquid to be controlled is only at a low level, since it is only employed for operation of the shutoff valve. Consequently, it is possible to provide such a valve with an actuator drive which may be operated by a control signal so that the valve is reliably operated in a sufficiently short time. Since the valve has a defined resting position, in which it connects the shutoff valve actuating cylinder with the shuttle valve, it will be seen that even if the control system fails, the accumulator will remain shut.

In accordance with preferred further developments of the invention, there is a choke located between the actuator cylinder and the actuator valve and also between the latter and the tank or other vessel. This choke ensures that there is no danger of the pressure, which as noted above may be in excess of 400 bar, suddenly rising to such a value that there would be a danger of damage in the actuator valve, in the lines and in the shutoff valve itself.

In keeping with a preferred embodiment of the invention, the shutoff valve is in the form of a cartridge 2/2 way valve; such a mass produced valve fulfills the above noted requirements as regards the shutoff valve to be used in the invention, forms a unit that may be fitted in the as-supplied condition and may be readily replaced by another valve of the same type, if for instance safety regulations require the replacement of the valve at regular intervals.

In keeping with a further development of the invention, the actuator valve is in the form of a multi-way slide valve which preferably has a solenoid actuator. Such a valve has a valve seat which in the neutral setting of the valve hermetically shuts off its port leading to the tank so that in this setting the servo or control pressure transmitted via the actuator valve is not able to reach the tank.

The actuator valve may furthermore be so designed that any pressure forces are directed so as to be perpendicular to the motion of its valve member so that only relatively small forces are required to operate the valve. Owing to the small duct cross section needed, the valve member of the actuator valve furthermore only has to shift through a relatively short distance for operation so that a solenoid is quite sufficient as an actuator for the actuator valve.

In accordance with a further preferred form of the invention, there is pressure measuring means with a pressure measuring sensor fitted or able to be fitted in it on both sides of the shutoff valve, preferably in the respective control line leading to the shuttle valve; these two pressure measuring means make it possible to measure any pressure relevant for the operation and safety of the system, so that, for instance, the supply pressure in the liquid storing means, the supply pressure of the hydraulic machine acting as a pump and the like may be ascertained. In the closed condition of the shutoff valve, the pressure differential sensed has to be constant and if this is not the case, this will be an indication of a fault. The two measuring means may be provided with a means which causes some form of remedial action and/or sets off an alarm.

As part of a further preferred form of the invention, a choke valve is connected between the pressure accumulator and the tank. This choke valve may be provided with an actuator motor if required and it serves to release the pressure in the accumulator into the tank in a safe manner, as is necessary during repairs or servicing operations on the pressure accumulator or the valve arrangement. It is furthermore possible to connect a choke valve actuator with a monitoring device which is connected with the measuring means so that if a fault develops, the pressure accumulator will be automatically emptied.

In accordance with a further teaching of the invention, at least some of the valves and chokes of the arrangement are accommodated in a common block. It is preferred for this block to have all the elements of the arrangement of the invention in it. The various power feed and control ducts of the arrangement in accordance with the invention are thus formed by drilled holes so that there is no danger of damage to connecting lines.

It is an advantage if this block is flange-mounted on the pressure accumulator; it is, however, equally satisfactory for the block to be located at any position where there is sufficient space for it. In this respect, it is not absolutely necessary for the block to be accessible from the outside as is the case with the prior art arrangements.

The block furthermore preferably has a pressure limiting valve therein which connects the pressure accumulator with the tank and has the purpose of automatically decreasing any excess pressure in the accumulator until it is at an acceptable value. Such an excess pressure may, for example, be caused by mechanical deformation of the pressure accumulator or by the action of heat. It is accordingly possible to locate the pressure accumulator together with the valve arrangement of the present invention in a vehicle even in positions where it is likely to be exposed to the rays of the sun or other sources of heat as for example, in a position in which it is unlikely to be damaged or burst if there is a road accident.

The invention thus creates a compact fitting in the form of a block with a safety function for use with hydraulic accumulators with a shut-off setting, a flow-through setting and with provision for discharging the accumulator directly into the tank via a choke valve. The pressure for actuation of the shutoff valve as such, which is preferably in some suitable form of a cartridge 2/2 way valve, is tapped directly from the ports for the accumulator or from the hydraulic unit connected therewith, the respectively higher one of the two pressures being selected in order to provide a reliable holding action. Furthermore, there are measuring ports for automatic, control or monitoring.

Both the cartridge 2/2 way valve and also its directional valve control are absolutely fluid tight when shut so that there is no chance of any pressure drop owning to leakage even for extended periods of time.

Chokes are incorporated in the control ducts for timing purposes.

The shutoff valve fitting in the form of a block in accordance with the invention is accordingly highly compact and may be furthermore mounted at any suitable position in a vehicle and remote operation of the valve is made possible so that the shutoff valve fitting in the form of a block is suitable for electro-hydraulic control systems. Moreover the simple structure leads to a reliable function.

BRIEF DESCRIPTION OF THE DRAWING

One embodiment of the invention will now be described in greater detail with reference to the accompanying diagrammatic drawing whose sole FIGURE shows the novel block-like shutoff valve fitting.

DETAILED DESCRIPTION OF A SPECIFIC EMBODIMENT OF THE INVENTION

In the drawing there is seen a block-like shutoff valve fitting 5 which has three hydraulic ports, that is to say the port P for connection with a hydraulic machine or unit in the form of a pump or of a motor, a port S for connection with a high or low pressure accumulator and the port T for connection with a tank or other vessel.

In the interior of the block-like shutoff valve fitting 5, there is a cartridge-type 2/2 way valve C which has an actuator cylinder 6 in which there is a movable actuator piston 9 making in sealing engagement with the cylinder. On its side remote from the pressure space of the actuator cylinder 6, the piston 9 is provided with a valve member 10 which in its terminal position shown in the FIGURE is adapted to engage a valve seat 11 in completely leak-proof manner.

In the interior of the valve C, the valve seat 11 separates a first space 7 with a port B adjacent to the actuator piston 9 from a second space 8 with a port A. The port B is connected via a power duct 3 with the accumulator port S, whereas the port A is connected via a power line 4 with the port P for the hydraulic unit. It is preferred to provide a spring in the valve C which acts on the actuator piston 9 and accordingly also urges the valve member 10 towards the valve seat 11.

The power line 4 is connected via a control line 1 with the input port of shuttle valve WV, whose other input port is connected via a control line 2 with the power line 3. The two control lines 1 and 2 and therefore also the respective power lines 4 and 3 are provided with a measuring port M' and, respectively, M" with respective pressure sensors.

The output port of the shuttle valve WV is connected via a further control line 20 with the actuator cylinder 6 of the valve C.

The shuttle valve WV includes a valve member, which shuts off that one of the two ports of the valve WV when the pressure is lower than at the other port so that the actuator cylinder 6 is always able to be connected with that power line 3 or 4 in which there is the higher pressure at a given time. Therefore steps are taken all the time to ensure that if the actuator cylinder 6 is under pressure, the pressure will be so high that the valve member 10 of the valve C will be kept engaged with the valve seat 11 with a sealing action.

In the control line 20 there is a directional slide valve W, illustrated in its neutral or inactive setting and from which it may be moved by the operation of a solenoid 12 acting against the force of a spring 13.

In the neutral position, the directional valve W connects the two branches of control line 20 with each other, between which the directional valve W is placed. At the same time, a relief line 21 is shut off by an absolutely fluid-tight valve seat seal. The relief line 21 connects the directional valve W with the port T for the tank.

If now the solenoid 12 is caused to operate the directional valve W against the action of the spring 13 and move the valve into its working position, that branch of the control line 20, which leads to the shutoff valve C, is connected with the relief line 20, whereas the branch 20 of the control line is sealed off. In this case, the actuator cylinder 6 is emptied via the port T and is therefore no longer under pressure so that the actuator piston 9 of the valve C is only subject to the pressure prevailing in its interior spaces 7 and 8 and the actuator piston 9 is moved upwards (in the figure) so that the valve member 10 is shifted away from the valve seat 11 with the result that the internal spaces 7 and 8 and accordingly the ports B and A of the valve are connected with each other and it is possible for hydraulic power fluid to travel between the ports S and P via the power lines 3 and 4 without any obstruction.

Between the shutoff valve C and the directional valve W there is a first choke DR' and between it and the tank port T there is a second choke DR" in the line 21. These two chokes are intended to prevent abrupt pressure drops in the actuator cylinder 6 of the shutoff valve C while on the other hand making possible a rapid opening of the shutoff valve C with a set speed, i.e. within a certain time.

The features of the arrangement so far described are sufficient for enabling it to function, even if the pressure measuring ports M' and M" are omitted. However, it is preferred for the block-like shutoff valve fitting to have a further pressure limiting valve DB, which connects the power line 3 with the relief line 21 and thus joins the ports S and T with each other. This pressure limiting valve DB serves to neutralize any increases in pressure due to outside influences (as for example an increase in temperature, deformation etc.) as may be liable to occur if there is a vehicle collision. If the increase in pressure in the pressure accumulator due to an external agency is not able to assume a critical value, the valve DB may be omitted.

Connected in parallel to the valve DB is a choke valve D which may be opened to connect the power line 3 with the relief line 21 and thus connect the port S for the pressure accumulator with the port T for the tank. It is thus possible to release fluid from the pressure accumulator by opening the choke valve D and thus render the accumulator pressureless. This is, for example, necessary if repairs are due or if the hydraulic oil is to be changed.

The choke valve D may be provided with a remote control system and coupled with a monitoring device or with a sensor. It is thus possible to couple the choke valve D with a cover of the arrangement so that on opening the cover, the pressure accumulator will be depressurized for safety reasons. It is also possible to connect the choke valve D with a readily accessible handle so that the pressure accumulator may be depressurized if there is a collision.

The functions of the block with a safety or shutoff valve action are as follows:

1. In the neutral setting shown in the figure the valve D is closed
2. When the valve W is operated, the valve C will open.
3. Any increase in pressure due to external effects is discharged via the valve DB.
4. It is possible for the pressure accumulator to be caused to discharge into the tank by opening the valve D.
5. The cartridge valve element C is acted upon by the higher of the two pressures at the ports A and B.

What is claimed is:

1. A valve arrangement for connection of a hydraulic pressure accumulator with a hydraulic machine and a reservoir tank, said valve arrangement comprising:

a leak-free shutoff valve having one port connected to a pressure accumulator and a second port connected to a hydraulic machine, said shutoff valve including:

an actuator cylinder and an actuator piston slidably movable in leak-proof manner in said cylinder by a control pressure and a valve member on said piston pressed against a valve seat of said shutoff valve when the piston is acted upon by the control pressure, a shuttle valve including control lines connecting the shuttle valve with each of the two ports of the shutoff valve and connecting the shuttle valve with a supply line for communicating said control pressure to said actuator cylinder, said shuttle valve including a displaceable valve member which moves in response to the control pressure at the two ports of said shuttle valve to connect said supply line with that one of the two ports which is at the higher control pressure than at said other port, and a leak-proof remote-controlled actuator valve in said supply line in one operative position for controlling the control pressure from said shuttle valve to said actuator piston for closing the shutoff valve , and said remote-controlled valve being constructed to assume another operative position in which it interrupts and by passes the connection between the shuttle valve and the cylinder to allow the control pressure to exhaust through said remote-controlled valve which opens a relief connection between the cylinder and the tank.

2. The valve arrangement as claimed in claim 1 further comprising a safety valve connected between the pressure accumulator and the tank and having an open state to provide communication between the pressure accumulator and the tank when the pressure applied to the safety valve reaches a predetermined maximum value.

3. The valve arrangement as claimed in claim 1 comprising a choke arranged in the line between the actuator valve and the actuator cylinder.

4. The valve arrangement as claimed in claim 3 comprising a second choke between the actuator valve and the tank.

5. The valve arrangement as claimed in claim 1 wherein said shutoff valve is a catridge 2/2 way valve.

6. The valve arrangement as claimed in claim 1 wherein said actuator valve is an electrically operated directional slide valve.

7. The valve arrangement as claimed in claim 1 comprising means defining pressure measuring points adapted for connection to a respective pressure sensor at each of the two ports of the shutoff valve.

8. The valve arrangement as claimed in claim 1 comprising a choke valve between the pressure accumulator and the tank.

9. The valve arrangement as claimed in claim 1 comprising a housing block in which at least some of the valves are accommodated.

10. The valve arrangement as claimed in claim 9 comprising at least one choice in at least one of said lines which is additionally accommodated in said block.

11. The valve arrangement as claimed in claim 10 comprising a safety valve between said accumulator and said tank for operation as a pressure limiting valve in said block.

* * * * *